XR 3,293,655

TX 3058D

50/1

Dec. 20, 1966 J. T. McNANEY 3,293,655

SYSTEM FOR TRANSFERRING DATA FROM A STORAGE MEDIUM TO A RECORD MEDIUM

Filed Dec. 24, 1964 2 Sheets-Sheet 1

INVENTOR.

Joseph T. McNaney

OR IN 346/108

INVENTOR.
Joseph T. McNaney

United States Patent Office 3,293,655 Patented Dec. 20, 1966

3,293,655

SYSTEM FOR TRANSFERRING DATA FROM A STORAGE MEDIUM TO A RECORD MEDIUM

Joseph T. McNaney, 8548 Boulder Drive, La Mesa, Calif. 92041

Filed Dec. 24, 1964, Ser. No. 420,996
6 Claims. (Cl. 346—108)

This invention relates to a system for transferring data from a storage medium to a record medium wherein the order and rate at which the data is transferred from the storage medium is the function of the angular positions of first and second polygon mirrors and the speed of rotation imparted thereto.

The invention relates the placement of coded data on a storage medium to the deflection characteristics of a pair of rotating polygon mirrors which are designed to rotate in synchronism with the movement of the storage medium. I utilize a pair of polygon mirrors in this invention to overcome a data record time loss factor inherent in systems utilizing but one polygon mirror as a light reflector of character shaped light beams. The coded data on the storage medium, therefore, is arranged in a series of first and second groups of recordations which coincide, respectively, with first and second polygon mirrors, and more particularly with the ability of the mirrors to present an uninterrupted series of lines of recordable information.

Other objects and advantages will appear hereinafter as a description of the invention proceeds.

The novel features that are considered characteristic of this invention are set forth with particularity in the appended claims. The invention itself, both as to its organization, and method of operation, as well as additional objects and advantages, which will occur to those skilled in the arts, will best be understood from the following description when read in connection with the accompanying drawings in which:

Figures 1, 2, 3:
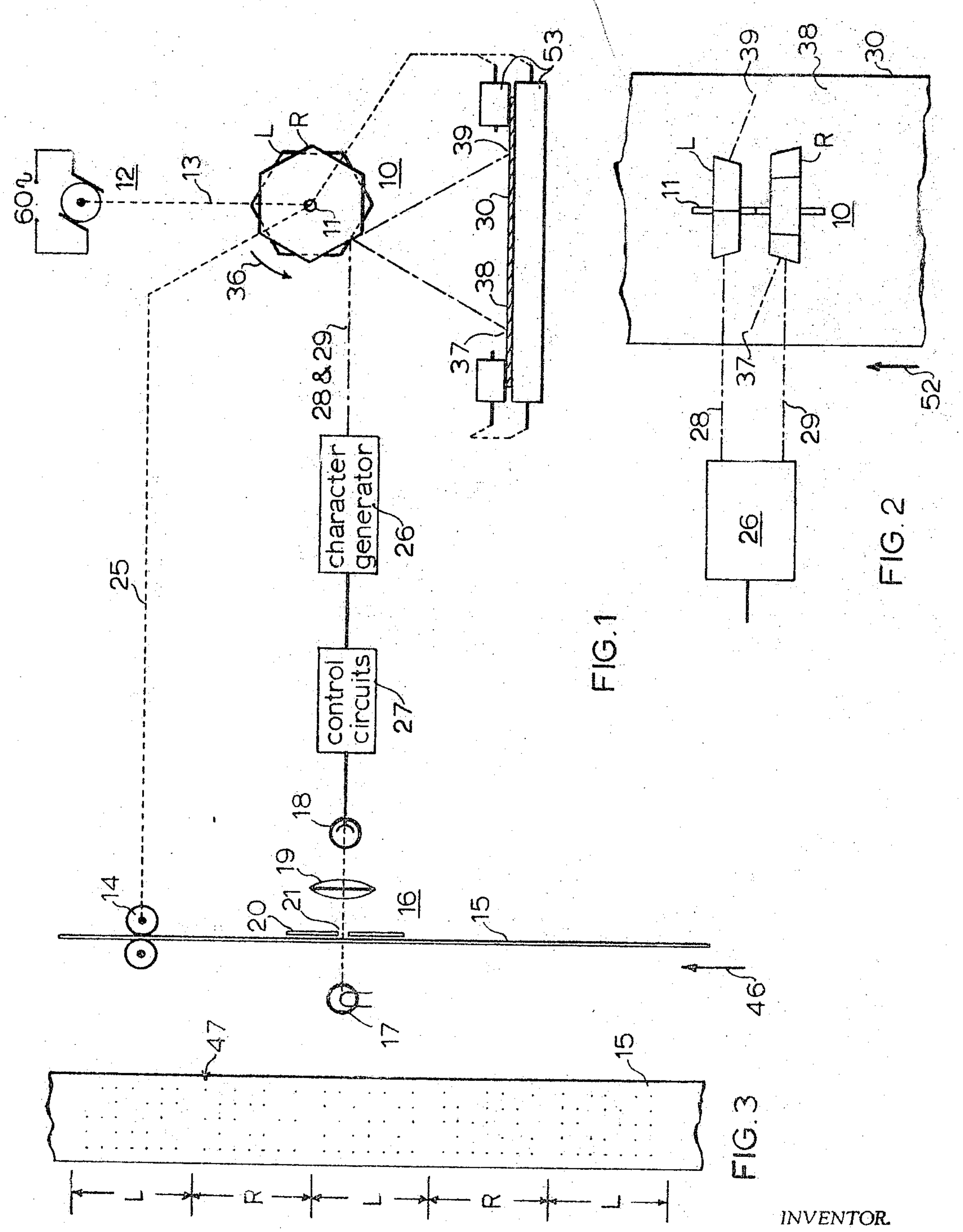
FIGURE 1 is a diagrammatic presentation of an exemplary system embodying the present invention.
FIGURE 2 is a top view of the reflection means shown in FIG. 1.
FIGURE 3 is a detail regarding the placement of data on the storage medium shown in FIG. 1.

Referring now to FIGURE 1, the exemplary system embodiment includes a pair of polygon mirrors 10, one of which will be referred to as the L (left) mirror and the other will be referred to as the R (right) mirror. The L and R mirrors are supported on a shaft 11 and made to rotate about an axis thereof by means of a motor 12 through an appropriate gearing 13. The system also includes means 14 for controlling the movement of a data storage medium 15 in relation to data detection means 16 adjacent thereto. The detection means 16, for example, consists of a light source 17 on one side of the medium 15, photoelectric means 18 on the opposite side of the medium 15, and a lens 19 and aperture light limiting means 20 for guiding coded light beams from the medium 15 to the photoelectric means 18. The storage medium 15, as shown in FIGURE 3, may be of opaque material with perforations therein corresponding to a series of codes representative of message symbols. These message symbol codes, it will be noted, are indicated as being in predetermined groups such as L–R–L–R etc. which positions on the medium 15 are related to reflecting surface positions, respectively, of the L mirror and the R mirror.

The drive wheel means 14 is linked mechanically through appropriate gearing 25 to the shaft 11 so that the polygon mirrors 10 will be driven in synchronism with the movement of the storage medium 15 in relation to the detection means 16. Intermediate the detection means 16 and the reflective surfaces of the polygon mirrors 10 there is a character generator 26 and the necessary control circuits 27. The control circuits 27 are adapted to receive data display control signals from the photoelectric means 18 and couple them to the character generator, or, what may be referred to as, the light generator 26. The light generator 26 may be of a type disclosed in my U.S. Patent 3,138,663 embodying a cathode ray readout of a character mask, as one example. Or the character generator 26 may be of a type disclosed in my U.S. Patents 3,101,233 or 3,121,867. However, in each of these patented inventions instead of generating but one symbol or character at a time the present invention requires the generation of two symbols, or characters, simultaneously in response to an individual message code. In the character mask readout system of Patent 3,138,663, for example, instead of having but one character illuminated upon the positioning of a spot of light behind a character mask, the spot of light will be used to illuminate two of the same character simultaneously. If the letter A is selected for recording purposes, there will be two such letters illuminated side-by-side in the mask. One letter A to the left of a common optical axis will be directed along a first optical path, and the other letter A to the right of the common axis will be directed along a second optical path; each letter A making use of a single lens system. However, if there is but one letter A generated, then a pair of lens systems could be utilized to direct two such letters along first and second optical paths.

In view of the above discussion of the character generator 26, and as indicated in FIGURE 2, each time a symbol or character is selected, two such symbols or characters will be directed along a first optical path 28 and a second optical path 29, respectively. A first light reflective means, or the L mirror, will intercept the shaped beams of the first optical path 28, and a second light reflective means, or the R mirror, will intercept the shaped beams of the second optical path 29. Whether or not the L mirror or the R mirror is in position to intercept such light beams will depend upon the angular position of the respective mirrors, and these positions are related to the position of the code groups in the storage medium 15 as the medium is being scanned by the detection means 16. And upon the intercepting of a series of character shaped light beams by the polygon mirrors 10, the recording of such a series will be a function of a limited and precise range of mirror 10 positions with respect to the optical paths 28 and 29.

Figure 5:
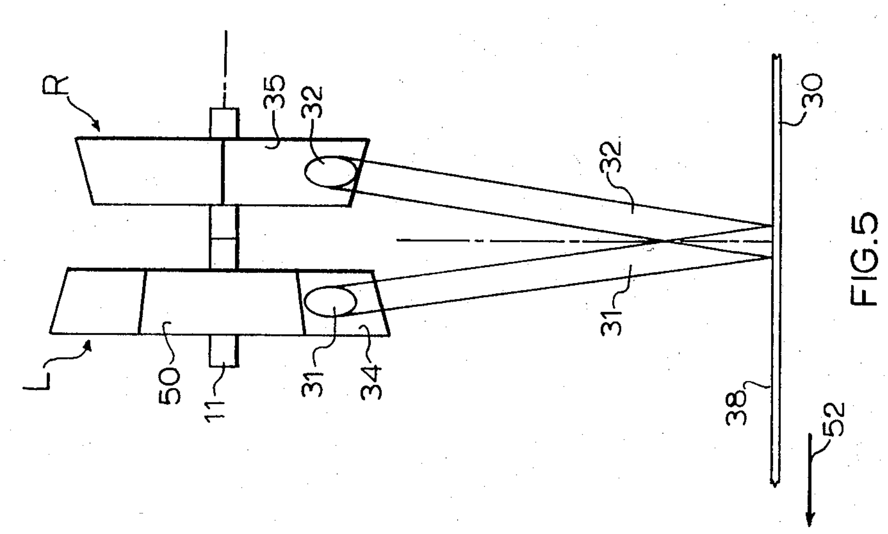
FIGURE 5 is a side view of the polygon mirrors as shown in FIG. 4.
Figure 4:
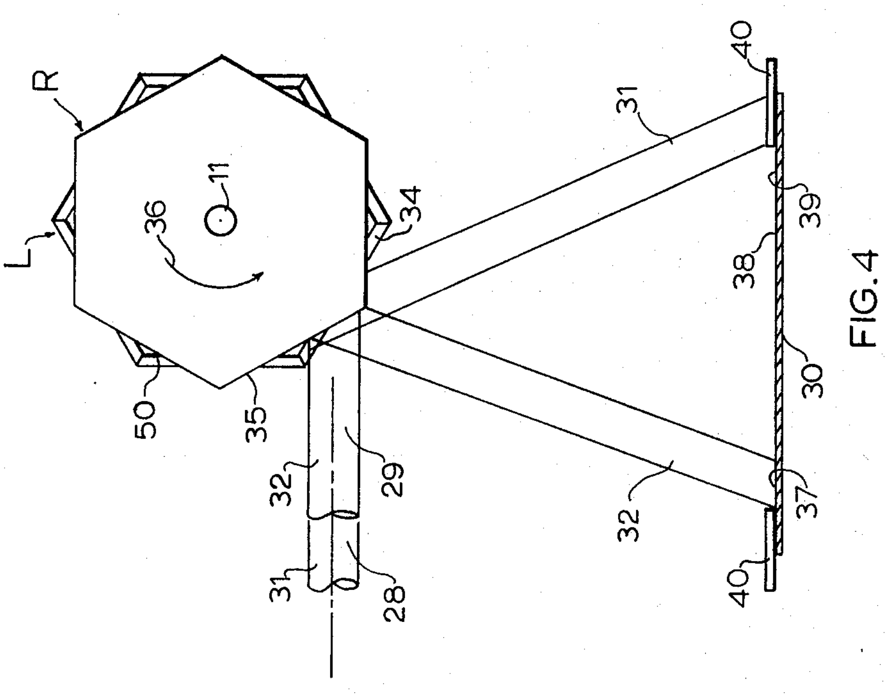
FIGURE 4 is a more detailed showing of the polygon mirrors shown in FIG. 1 and FIG. 2.

Referring now to the more detailed showing of the polygon mirrors 10 in FIGURES 4 and 5, each of the L and R mirrors are staggered in a manner necessary to accomplish full time recording cycles, and of equal importance their reflecting surfaces are arranged so as to effect a convergence of first and second series of shaped light beams in the process of redirecting the beams toward the surface of a record medium 30. Two somewhat circular cross section light beams 31 and 32, representing two like characters being generated by the light generator 26 and directed along first and second optical paths, are being intercepted by the polygon mirrors 10. The beam 31 is being intercepted by a reflecting surface 34 of the L mirror, and the beam 32 is being intercepted by a reflecting surface 35 of the R mirror. The mirrors 10 will be rotated in the direction of the arrow 36, and in the position shown, the surface 34 of the L mirror will have just completed its deflection of a line of characters, extending from one side 37 of the surface 38 of the medium 30 to the opposite side 39 of the surface 38, and the surface 35 of the R mirror will have just begun its deflection of a succeeding line of characters. Although each character generation will consist of two similarly shaped beams, a mask 40 adjacent the record medium 30 will permit but one of the beams to be exposed to the surface 38.

While the mirrors 10 are rotating in the direction of the arrow 36 the storage medium is being moved in the direction of the arrow 46, and in the R mirror position shown, an initial message code 47 of an R group of the storage medium 15 will be aligned with the slit 21 in the light limiting means 20. As the storage medium 15 is being moved in relation to the slit 21 the detection of the series of codes in the R group following the code 47 will occur simultaneously with the deflection of light beams, corresponding to said codes, from the one side 37 of the surface 38 to the opposite side 39. The detection of a succeeding L group of codes in the medium 15 will occur simultaneously with the deflection of beams by the succeeding reflecting surface 50 of the L mirror.

Beam convergence of the series of deflected beams, by the L mirror and then by the R mirror, is illustrated in FIGURE 5. Each of the surfaces of the polygon mirrors 10 are tilted sufficiently to effect a converging of L mirror beam deflections and R mirror beam deflections, successively. First and second series of beams will thereby intersect at a line extending from the one side 37 of the surface 38 to the opposite side 39 thereof, and coincident with a surface 38 plane. Each series of beams will represent a line of message characters that will be recorded on the surface 38, and a succession of such lines will be exposed to the surface by moving the record medium 30 in the direction of the arrow 52 as viewed in FIGURES 2 and 5. The necessary drive wheels 53 are geared to the polygon mirrors 10 so that the record medium 30 movement will be in synchronism with the storage medium 15 movement and the rotation of the polygon mirrors 10. The character generator 26 will, of course, function as a slave to the moving members of the system and operate in response to the coded data of the storage medium 15 as the individual codes are aligned with the aperture 21 of the light limiting means 20. And as hereinbefore set forth, following an alignment of an individual message character code with the aperture 21, a pair of like character shaped beams will be projected along first and second optical paths 28 and 29 so that either the L mirror, or the R mirror, depending on which of the two are in a position to do so, will redirect one of the beams toward the light sensitive recording surface of the record medium 30. But in doing so, either one or the other of the two like beams will register on the same spot of the surface 38, thereby permitting full-time recording of information corresponding to the coded data on the storage medium 15.

In view of the objects of the present invention, it will be obvious to those skilled in the photocomposing machine art that the system improvements disclosed herein will make it possible to increase the printing rates of such machines. The invention also lends itself extremely well to the use of paper tapes containing codes in an edited and justified format. However, other storage media, such as magnetic tapes or drums, or solid state devices, may be used instead of the storage medium illustrated and described.

It should, of course, be understood that many of the other embodiments embracing the general principles and constructions hereinbefore set forth, may be utilized and still be within the ambit of the present invention.

The particular embodiments of the invention illustrated and described herein is illustrative only, and the invention includes such other modifications and equivalents as may readily appear to those skilled in the arts, and within the scope of the appended claims.

I claim:

1. A system for transferring data from a storage medium to a record medium including:

(a) a storage medium containing first and second groups of recordations of coded data;

(b) detection means adjacent said storage medium for converting said groups to corresponding data display control signals upon the movement of said storage medium in relation to said detection means;

(c) a light generator with means for (1) converting signals of said first group into a first series of corresponding character shaped light beams and directing said first series along a first optical path, and (2) converting signals of said second group into a second series of corresponding character shaped light beams and directing said second series along a second optical path;

(d) a record medium presenting a light sensitive recording surface;

(e) first light reflective means for intercepting said first series and directing an initial beam thereof to a reference point adjacent, and to one side of, said recording surface;

(f) second light reflective means for intercepting said second series and directing an initial beam thereof to said reference point;

(g) means for (1) changing the angular position of said first reflective means in synchronism, and coincident, with said movement of the first group in relation to said detection means, and (2) redirecting said first series of beams along a line extending from said reference point to a predetermined point adjacent, and on an opposite side of, said recording surface;

(h) means for (1) changing the angular position of said second reflective means in synchronism, and coincident, with said movement of the second group in relation to said detection means, and (2) redirecting said second series of beams along said line and toward said predetermined point; and (i) said first and second series of beams intersecting said line.

2. The invention as set forth in claim 1 additionally including:

(j) the placement of said first and second groups of recordations on said storage medium being adapted to coincide respectively with predetermined angular positions of said first and second light reflective means.

3. The invention as set forth in claim 1 additionally including:

(j) said first and second light reflective means comprising first and second polygon mirrors with means for positioning the surfaces thereof to intercept, respectively, first and second series of beams coincident with the detection of first and second groups of recordations.

4. The invention as set forth in claim 1 additionally including:

(j) means for moving said record medium substantially perpendicular to the line along which said first and second series of beams are directed so as to record thereon a series of first and second lines of character shaped light beams.

5. The invention as set forth in claim 1 additionally including:

(j) said record medium being exposed (1) to reflections of light beams from said first reflective means simultaneously with the converting of said first group of recordations, and (2) to reflections of light beams from said second reflective means simultaneously with the converting of said second group of recordations.

6. The invention as set forth in claim 1 additionally including:

(j) said light reflective means including first and second polygon mirrors presenting surfaces for redirecting beams from said first optical path along said line followed by a redirecting of beams from said second optical path along said line.

References Cited by the Examiner

UNITED STATES PATENTS

| | | | |
|---|---|---|---|
| 2,769,922 | 11/1956 | Peery | 250—219 |
| 2,844,648 | 7/1958 | Rosenthal | 178—7.6 X |
| 3,138,663 | 6/1964 | McNaney | 346—110 X |
| 3,142,224 | 7/1964 | Andrews et al. | 88—24 |

RICHARD B. WILKINSON, *Primary Examiner.*